United States Patent
Chapman et al.

(10) Patent No.: US 10,287,954 B2
(45) Date of Patent: May 14, 2019

(54) MODULAR MIXER FOR EXHAUST ASSEMBLY

(71) Applicant: Faurecia Emissions Control Technologies USA, LLC, Columbus, IN (US)

(72) Inventors: Chris Chapman, Columbus, IN (US); Robin Willats, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 434 days.

(21) Appl. No.: 15/039,191

(22) PCT Filed: Jan. 10, 2014

(86) PCT No.: PCT/US2014/010989
§ 371 (c)(1),
(2) Date: May 25, 2016

(87) PCT Pub. No.: WO2015/105500
PCT Pub. Date: Jul. 16, 2015

(65) Prior Publication Data
US 2017/0022870 A1    Jan. 26, 2017

(51) Int. Cl.
*F01N 1/00*    (2006.01)
*F01N 3/28*    (2006.01)
(Continued)

(52) U.S. Cl.
CPC .......... *F01N 3/2892* (2013.01); *F01N 3/021* (2013.01); *F01N 3/28* (2013.01); *F01N 13/009* (2014.06);
(Continued)

(58) Field of Classification Search
CPC ........ F01N 3/28; F01N 3/021; F01N 13/1838; F01N 13/009; F01N 3/2892
(Continued)

(56) References Cited

U.S. PATENT DOCUMENTS 6,401,455 B1    6/2002   Mathes et al.
8,250,859 B2    8/2012   Torisaka et al.
(Continued)

FOREIGN PATENT DOCUMENTS

EP    2123878 A1    11/2009
JP    2005273578    10/2005
(Continued)

OTHER PUBLICATIONS

Supplementary European Search Report for European Application No. 14878138.3 dated Aug. 17, 2017.
Search Report from corresponding PCT/US14/10989.

*Primary Examiner* — Jason D Shanske
(74) *Attorney, Agent, or Firm* — Carlson, Gaskey & Olds, P.C.

(57) ABSTRACT

A vehicle exhaust component includes a first exhaust component, a second exhaust component downstream of the first exhaust component, and a mixer that connects an outlet of the first exhaust component to an inlet to the second exhaust component. The mixer includes a first housing portion with a first connection interface and a second housing portion with a second connection interface. The first housing portion is attached to the outlet of the first exhaust component and the second housing portion is attached to the inlet of the second exhaust component. The first and second connection interfaces are connectable to each other in one of a plurality of different connection orientations such that the first and
(Continued)

second exhaust components can be positioned at any of a plurality of different mounting orientations relative to each other.

19 Claims, 4 Drawing Sheets

(51) Int. Cl.
| | | |
|---|---|---|
| *F01N 3/021* | (2006.01) | |
| *F01N 13/18* | (2010.01) | |
| *F01N 13/00* | (2010.01) | |
| *F01N 3/20* | (2006.01) | |

(52) U.S. Cl.
CPC ........ *F01N 13/1838* (2013.01); *F01N 3/2066* (2013.01); *Y02T 10/20* (2013.01)

(58) Field of Classification Search
USPC .......................................................... 60/324
See application file for complete search history.

(56) References Cited

U.S. PATENT DOCUMENTS

| | | |
|---|---|---|
| 8,371,114 B2 | 2/2013 | Hayashi et al. |
| 8,955,312 B2 | 2/2015 | Watahiki et al. |
| 2010/0000203 A1* | 1/2010 | Kowada ............ B01D 46/0027 60/286 |
| 2013/0164182 A1 | 6/2013 | Lijima et al. |
| 2013/0216442 A1 | 8/2013 | Brunel et al. |
| 2014/0196444 A1* | 7/2014 | Watahiki ................. F01N 3/035 60/297 |

FOREIGN PATENT DOCUMENTS

| | | |
|---|---|---|
| JP | 2009114910 A | 5/2009 |
| JP | 2009167806 A | 7/2009 |
| JP | 5066435 | 11/2012 |
| JP | 5114219 B2 | 1/2013 |
| KR | 10-2014-0002326 | 1/2014 |

* cited by examiner

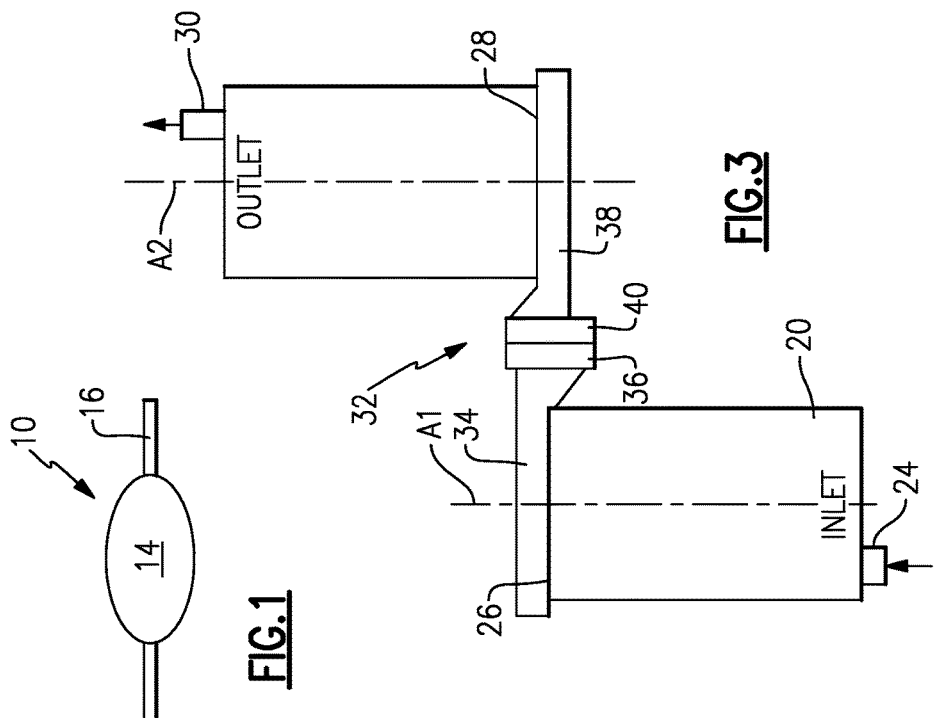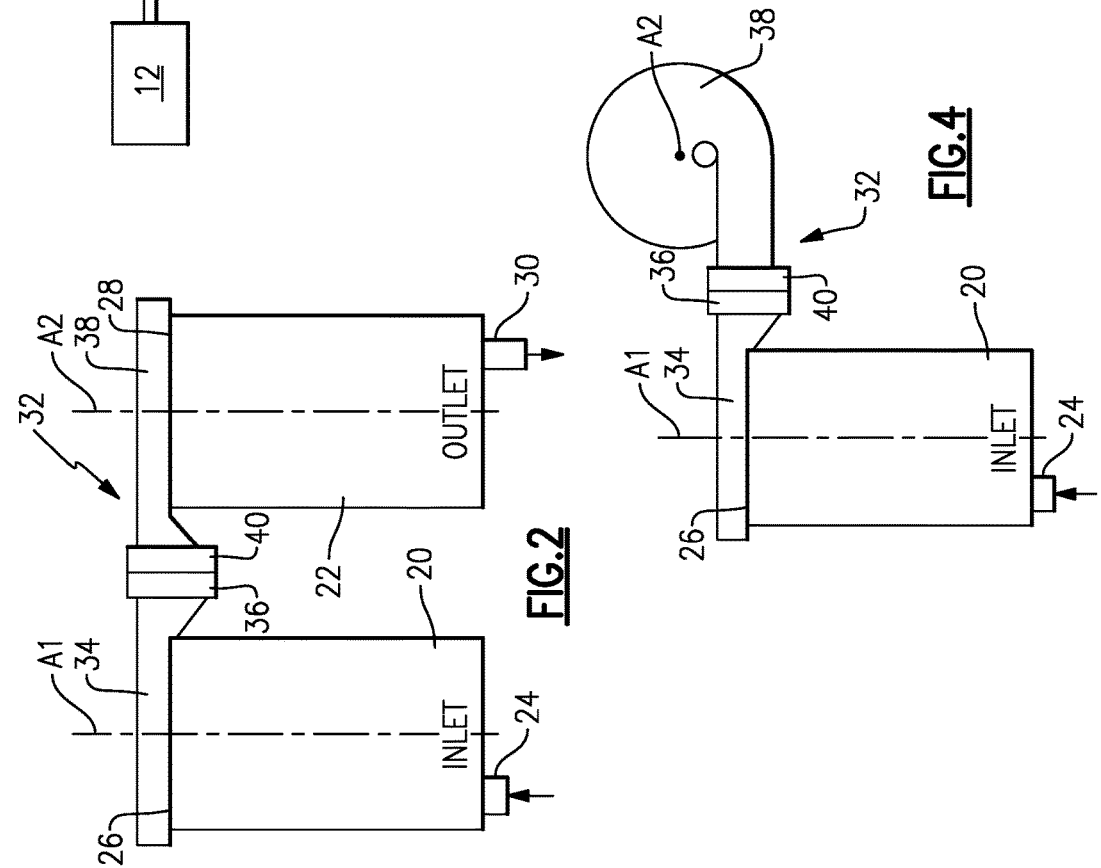

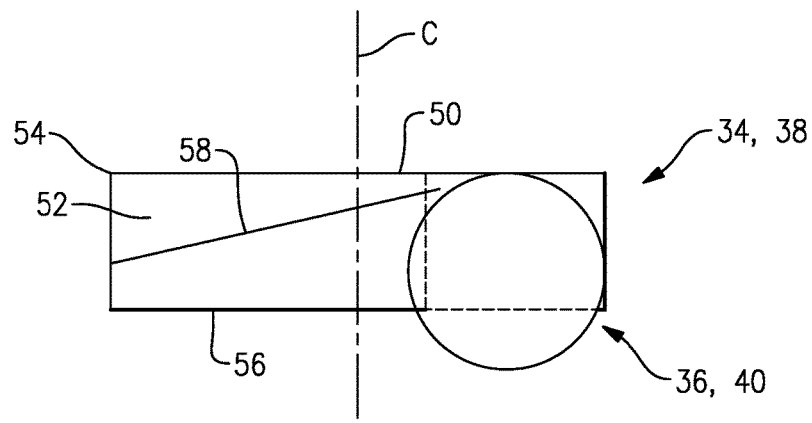
FIG. 7
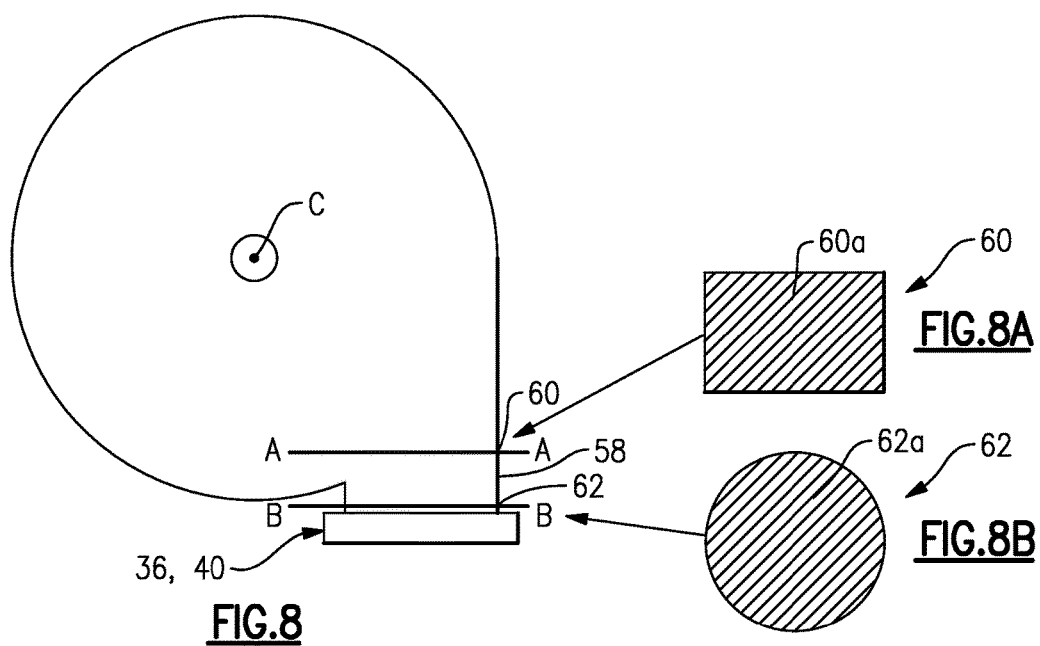
FIG. 8
FIG. 8A
FIG. 8B

MODULAR MIXER FOR EXHAUST ASSEMBLY

TECHNICAL FIELD

The subject invention relates to a vehicle exhaust system that includes a modular mixer that can be utilized in various different exhaust system configurations.

BACKGROUND OF THE INVENTION

An exhaust system conducts hot exhaust gases generated by an engine through various exhaust components to reduce emissions and control noise. The exhaust system includes components such as filters, diesel oxidation catalysts (DOC), selective catalytic reduction (SCR) catalysts, mufflers, tailpipes, etc. that are coupled together to conduct the engine exhaust gases to an external atmosphere. Often a mixer component is utilized to thoroughly mix exhaust gases with a fluid that is introduced into the exhaust gas flow via an injector. An example of such a fluid would be fuel for a fuel-fired burner or urea for a SCR catalyst.

These components are arranged in different configurations dependent upon vehicle size and/or vehicle application. It is often difficult to arrange all of the exhaust system components efficiently within tight packaging restraints. Further, each vehicle configuration has a different packaging envelope, which can require slightly different connection orientations between mating components for each different configuration. This can disadvantageously increase cost.

SUMMARY OF THE INVENTION

In one exemplary embodiment, a vehicle exhaust component assembly includes a first exhaust component, a second exhaust component downstream of the first exhaust component, and a mixer that connects an outlet of the first exhaust component to an inlet to the second exhaust component. The mixer includes a first housing portion with a first connection interface and a second housing portion with a second connection interface. The first housing portion is attached to the outlet of the first exhaust component and the second housing portion is attached to the inlet of the second exhaust component. The first and second connection interfaces are connectable to each other in one of a plurality of different connection orientations such that the first and second exhaust components can be positioned at any of a plurality of different mounting orientations relative to each other.

In a further embodiment of the above, one of the first and second connection interfaces is rotated relative to the other of the first and second connection interfaces when moving between the plurality of connection orientations.

In a further embodiment of any of the above, each of the first and second connection interfaces comprises a first tubular extension defined by a first cross-section shape and a coupling portion defined by a second cross-section shape that is different than the first cross-section shape.

In a further embodiment of any of the above, the first cross-section shape is polygonal and the second cross-section shape is curvilinear.

In a further embodiment of any of the above, the first exhaust component defines a first central axis extending along a length of the first exhaust component and the second exhaust component defines a second central axis extending along a length of the second exhaust component, and wherein one of the plurality of different connection orientations comprises a parallel orientation where the first central axis is parallel to the second central axis.

In a further embodiment of any of the above, another one of the plurality of different connection orientations comprises a perpendicular orientation where the first central axis is perpendicular to the second central axis.

In a further embodiment of any of the above, one of the first and second exhaust components comprises a catalyst and the other of the first and second exhaust components comprises a diesel particulate filter.

In a further embodiment of any of the above, an injector is mounted to one of the first and second housing portions adjacent an outlet of the diesel particulate filter.

In another exemplary embodiment, a method of assembling a vehicle exhaust component assembly includes the steps of connecting the first housing portion to an outlet of the first exhaust component, connecting the second housing portion to an inlet of the second exhaust component, selecting a desired mounting orientation from a plurality of mounting orientations of the first and second exhaust components relative to each other, moving one of the first and second connection interfaces relative to the other of the first and second connection interfaces to place the first and second exhaust components in the desired mounting orientation, and fixing the first and second connection interfaces to each other.

These and other features of this application will be best understood from the following specification and drawings, the following of which is a brief description.

BRIEF DESCRIPTION OF THE DRAWINGS

FIG. 1 schematically illustrates one example of an exhaust system.

FIG. 2 is a schematic view of one example of a modular mixer in one mounting configuration.

FIG. 3 is a schematic view of one example of a modular mixer in another mounting configuration.

FIG. 4 is a schematic view of one example of a modular mixer in another mounting configuration.

FIG. 7 is a schematic side view of the mixer from FIGS. 2-6.

FIG. 8 is a top view of the mixer of FIG. 7.

FIG. 8A is a section view taken along A-A as indicated in FIG. 8.

FIG. 8B is a section view taken along B-B as indicated in FIG. 8.

DETAILED DESCRIPTION

Figure 5:
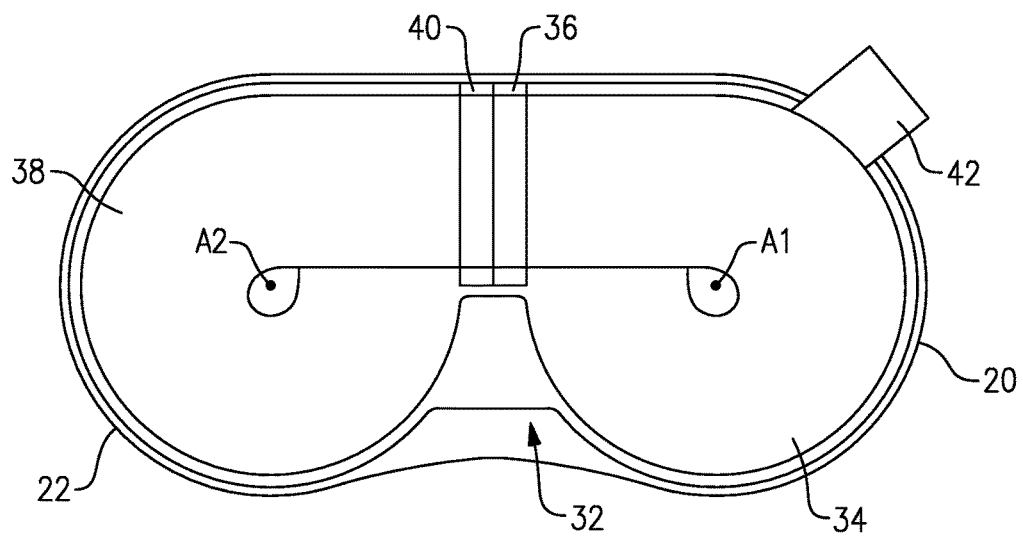
FIG. 5 is a schematic view of one example of a modular mixer in another mounting configuration.

FIG. 1 shows a vehicle exhaust system 10 that conducts hot exhaust gases generated by an engine 12 through various exhaust components 14 to reduce emission and control noise as known. The various exhaust components 14 can include diesel oxidation catalysts (DOC), selective catalytic reduction (SCR) catalysts, particulate filters, mufflers, exhaust pipes, etc. These components 14 can be mounted in various different configurations and combinations dependent upon vehicle application and available packaging space. Engine exhaust gases go through the components 14 and exit to the atmosphere via a tailpipe 16.

In one example shown in FIG. 2, the exhaust components 14 comprise a first exhaust component 20 and a second exhaust component 22 that is downstream of the first exhaust component 20. The first exhaust component 20 includes an inlet 24 that receives exhaust gases from the engine 12 or another upstream exhaust component and an outlet 26. The second exhaust component 22 includes an inlet 28, which is downstream of the outlet 26 of the first exhaust component 20, and an outlet 30. Additional components 14 could be positioned upstream of the first exhaust component 20 and/or downstream of the second exhaust component 22 as known.

A mixer 32 connects the outlet 26 of the first exhaust component 20 to the inlet 28 to the second exhaust component 22. The mixer 32 includes a first housing portion 34 with a first connection interface 36 and a second housing portion 38 with a second connection interface 40. The first housing portion 34 is attached to the outlet 26 of the first exhaust component 20 and the second housing portion 38 is attached to the inlet 28 of the second exhaust component 22. The first 36 and second 40 connection interfaces are connectable to each other in one of a plurality of different connection orientations such that the first 20 and second 22 exhaust components can be positioned at any of a plurality of different mounting orientations relative to each other.

Mounting orientations can vary due to vehicle size and type. For example, larger vehicles may have more available packaging space than smaller vehicles, which makes it more difficult to efficiently package exhaust components in the limited available space. Once a desired mounting orientation is selected from the plurality of different available mounting orientations the first 36 and second 40 connection interfaces are arranged relative to each other to place the first 20 and second 22 exhaust components in the desired mounting orientation. Then, the first 36 and second 40 connection interfaces are fixed to each other by any of various methods such as welding, brazing, fastening, etc., for example.

The first exhaust component 20 defines a first central axis A1 extending along a length of the first exhaust component 20 and the second exhaust 22 component defines a second central axis A2 extending along a length of the second exhaust component 22. In the example shown in FIG. 2, the selected one of the plurality of different connection orientations is a parallel orientation where the first central axis A1 is parallel to the second central axis A2. Further, the first 20 and second 22 exhaust components extend outwardly from the same side of the mixer 32.

The example shown in FIG. 3 is also a parallel configuration; however, the first exhaust component 20 extends outwardly from one side of the mixer 32 and the second exhaust component 22 extends outwardly from an opposite side of the mixer 32. In this configuration one of the exhaust components 20, 22 has been rotated 180 degrees relative to the other exhaust component 20, 22. The first central axis A1 is parallel to the second central axis A2.

In the example shown in FIG. 4, the selected connection orientation comprises a perpendicular orientation where the first central axis A1 is perpendicular to the second central axis A2. In this configuration, one of the exhaust components 20, 22 has been rotated 90 degrees relative to the other exhaust component 20, 22.

Figure 6:
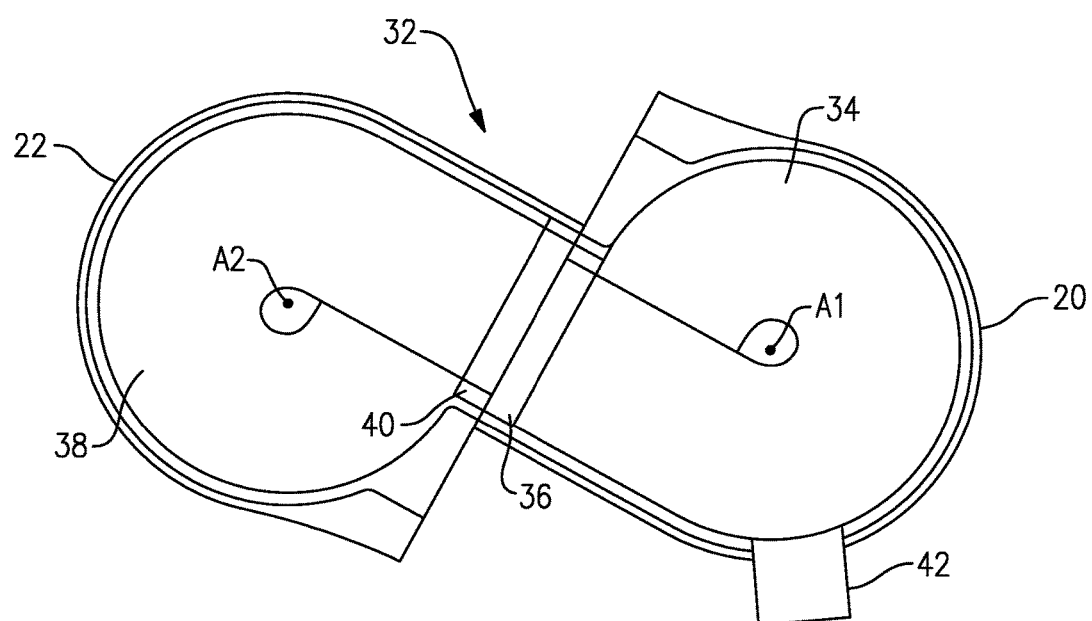
FIG. 6 is a schematic view of one example of a modular mixer in another mounting configuration.

FIGS. 5-6 show other examples of parallel configurations where the first A1 and second A2 axes are parallel to each other. Thus, by simply rotating the connection interfaces 36, 40 relative to each other, the exhaust components 20, 22 can be positioned in any of an infinite number of different mounting orientations relative to each other.

In these examples, the first exhaust component 20 comprises a diesel particulate filter DPF and the second exhaust component 22 comprises a selective catalytic reduction (SCR) catalyst. An injector 42 is mounted to the mixer 32 to introduce a fluid, such as urea for example, to be mixed with exhaust gases by the mixer 32. In the example shown, the injector 42 is mounted to the first housing portion 34 of the mixer 32 adjacent the outlet 26 from the DPF; however, the injector 42 could also be mounted at other locations dependent upon system requirements and available packaging space. It should be understood that while the components are shows as being a DPF and SCR catalyst, other combinations of components could be connected to each other via the mixer 32.

As shown in FIGS. 7-8, the first 34 and second 38 housing portions each comprise a bottom surface 50 with a wall 52 extending outwardly about an outer periphery 54 of the bottom surface 50. In this example, the first 34 and second 38 housing portions each comprise a bowl-shaped component defining a mixer center C and having an open end 56 configured for attachment to a respective one of the first 20 and second 22 exhaust components. Inside the mixer 32 are baffles or other structures that are used to mix the exhaust gas with the injected fluid. It should be understood that any type of mixer could be used to connect the exhaust components together, and that the mixer could have any of various different shapes.

In the example shown, the first 36 and second 40 connection interfaces comprise axial extension portions 58 that extend tangentially relative to the wall 52. As such, the first 36 and second 40 connection interfaces each comprise axial extension portions 58 that are radially offset from the mixer center C. In one example, each of the first 36 and second 40 connection interfaces comprises a first tubular extension 60 defined by a first cross-section shape 60a (FIG. 8A) and a coupling portion 62 defined by a second cross-section shape 62a (FIG. 8B) that is different than the first cross-section shape 60a. In one example, the first cross-section shape 60a is polygonal and the second cross-section 62a shape is curvilinear. For example, the first cross-section shape 60a is square or rectangular forming a square or rectangular tube portion, and the second cross-section shape 62a is circular forming a circular coupling portion. By providing a curvilinear coupling for each housing portion 34, 38, once the housing portions 34, 38 are attached to the respective first 20 and second 22 exhaust components, the exhaust components can be orientated relative to each other in various different configurations by rotating the connection interfaces to each other. Once the components are in the desired orientated. The two coupling portions 62 are fixed together.

Figure 10:
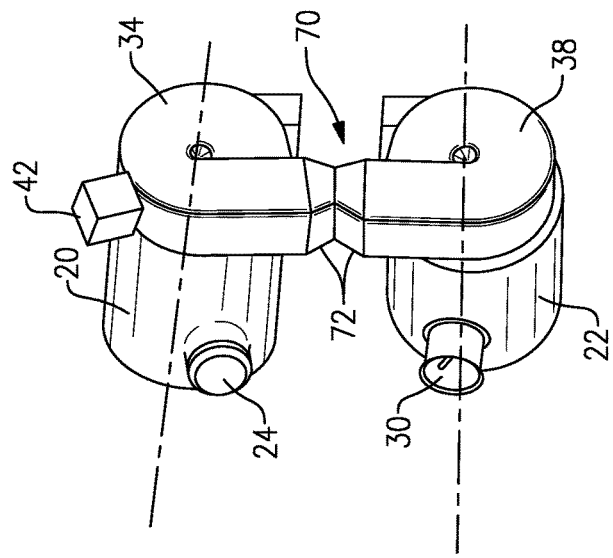
FIG. 10 is a schematic view of one example of a modular mixer in another mounting configuration.
Figure 11:
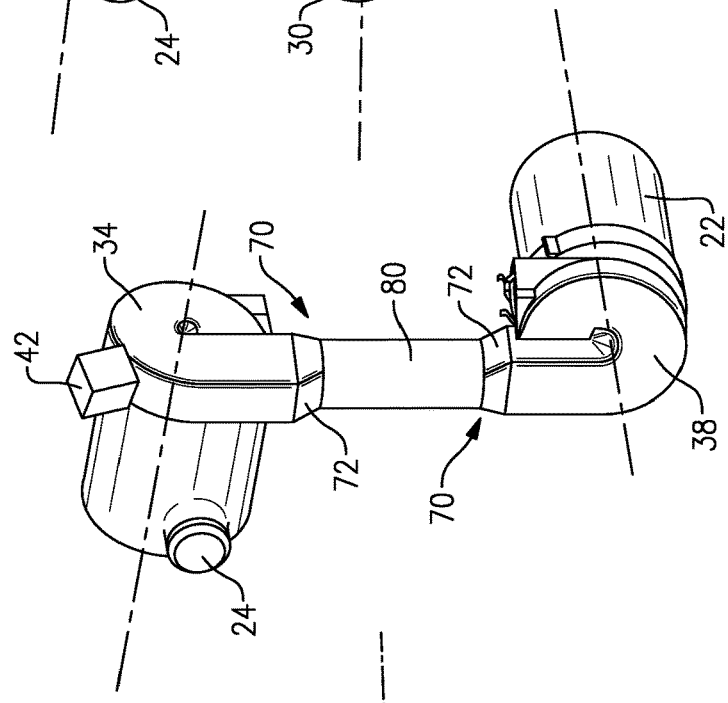
FIG. 11 is a schematic view of one example of a modular mixer in another mounting configuration.
Figure 9:
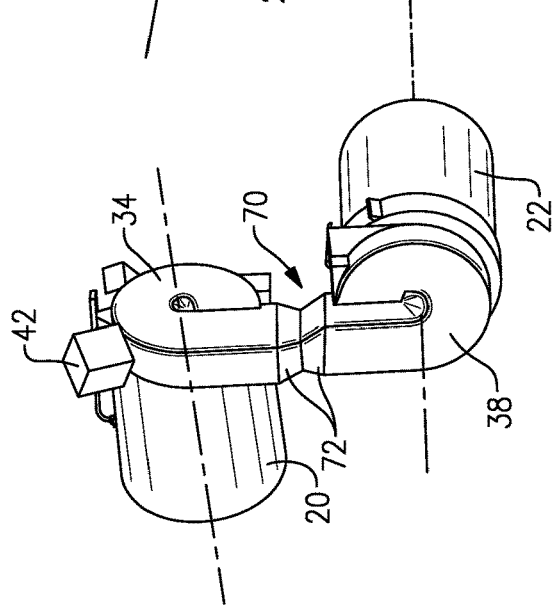
FIG. 9 is a schematic view of one example of a modular mixer in another mounting configuration.

FIGS. 9-11 show additional examples of different mounting configurations for the first 20 and second 22 exhaust components. Further, these examples show a different connection interface 70 for each of the housing portions 34, 38. The connection interface comprises a neck or narrowed down portion, as indicated at 72, to connect to the corresponding neck 72 of the other housing portion. The shapes of the necks can comprise any of various shapes.

FIG. 9 shows a perpendicular configuration where the second housing portion 34 has been rotated 90 degrees relative to the first housing portion 34 such that the first A1 and second A2 central axes are perpendicular and non-intersecting. FIG. 10 shows a parallel configuration where the axes A1, A2 are spaced apart and parallel to each other. FIG. 11 shows a configuration similar to FIG. 9 but which includes a tubular extension 80 to lengthen the distance between the components 20, 22.

The subject invention uses a modular mixer design that includes first and second housing portions to provide a plenum connection interface between two exhaust components. The use of a connecting joint for each housing portion allows multiple clocking positions. Providing a cross-section change from polygonal to curvilinear makes the design modular and enables the installation in multiple clocking positions. Thus, the modular configuration could be adapted for various packages without a large change to mixing performance.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component assembly comprising:
   a first exhaust component;
   a second exhaust component downstream of the first exhaust component; and
   a mixer connecting an outlet of the first exhaust component to an inlet to the second exhaust component, the mixer comprising a first housing portion with a first connection interface and a second housing portion with a second connection interface, wherein the first housing portion is attached to the outlet of the first exhaust component and the second housing portion is attached to the inlet of the second exhaust component, and wherein the first and second connection interfaces are connectable to each other in one of a plurality of different connection orientations such that the first and second exhaust components can be positioned at any of a plurality of different mounting orientations relative to each other, and wherein the first and second housing portions each define a mixer center, and wherein the first and second housing portions each comprise a bottom surface with a wall extending outwardly about an outer periphery of the bottom surface, and wherein the first and second connection interfaces comprise axial extension portions that are radially offset from the respective mixer center and extend tangentially relative to the wall; and
   an injector mounted to one of the first and second housing portions, the injector configured to inject a fluid into the mixer.

2. The vehicle exhaust component assembly according to claim 1, wherein one of the first and second connection interfaces is rotated relative to the other of the first and second connection interfaces when moving between the plurality of connection orientations.

3. The vehicle exhaust component assembly according to claim 1, wherein each of the first and second connection interfaces comprises a first tubular extension defined by a first cross-section shape and a coupling portion defined by a second cross-section shape that is different than the first cross-section shape.

4. The vehicle exhaust component assembly according to claim 3, wherein the first cross-section shape is polygonal and the second cross-section shape is curvilinear.

5. The vehicle exhaust component assembly according to claim 1, wherein the first exhaust component defines a first central axis extending along a length of the first exhaust component and the second exhaust component defines a second central axis extending along a length of the second exhaust component, and wherein one of the plurality of different connection orientations comprises a parallel orientation where the first central axis is parallel to the second central axis.

6. The vehicle exhaust component assembly according to claim 5, wherein another one of the plurality of different connection orientations comprises a perpendicular orientation where the first central axis is perpendicular to the second central axis.

7. The vehicle exhaust component assembly according to claim 1, wherein the first and second exhaust components extend from the mixer in opposite directions relative to each other.

8. The vehicle exhaust component assembly according to claim 1, wherein the first and second exhaust components extend from the mixer in the same direction.

9. The vehicle exhaust component assembly according to claim 1, wherein one of the first and second exhaust components comprises a catalyst and the other of the first and second exhaust components comprises a diesel particulate filter.

10. The vehicle exhaust component assembly according to claim 9, wherein the injector is adjacent to an outlet of the diesel particulate filter.

11. The vehicle exhaust component assembly according to claim 1, wherein the first and second housing portions each comprise a bowl-shaped component defining the respective mixer center and having an open end configured for attachment to a respective one of the first and second exhaust components.

12. The vehicle exhaust component assembly according to claim 11, wherein the axial extension portions comprise one of a square or rectangular tube that transitions into a circular coupling portion.

13. The vehicle exhaust component assembly according to claim 1 wherein one of the first and second connection interfaces is rotated relative to the other of the first and second connection interfaces about an axis of rotation when moving between the plurality of connection orientations, and wherein the plurality of different mounting orientations includes at least a parallel mounting orientation where central axes defined by the first and second exhaust components are parallel to each other and a non-parallel mounting orientation where the central axes are non-parallel to each other, and wherein the axis of rotation is perpendicular to at least one of the central axes defined by the first and second exhaust components.

14. A method of assembling a vehicle exhaust component assembly comprising:
   (a) providing a mixer comprising a first housing portion with a first connection interface and a second housing portion with a second connection interface, and wherein the first and second housing portions each define a mixer center, and wherein the first and second housing portions each comprise a bottom surface with a wall extending outwardly about an outer periphery of the bottom surface, and wherein the first and second connection interfaces comprise axial extension portions that are radially offset from the respective mixer center and extend tangentially relative to the wall;
   (b) connecting the first housing portion to an outlet of a first exhaust component;
   (c) connecting the second housing portion to an inlet of a second exhaust component;

(d) selecting a desired mounting orientation from a plurality of mounting orientations of the first and second exhaust components relative to each other;

(e) moving one of the first and second connection interfaces relative to the other of the first and second connection interfaces to place the first and second exhaust components in the desired mounting orientation; and (f) fixing the first and second connection interfaces to each other.

15. The method according to claim 14 wherein step (e) further includes rotating one of the first and second connection interfaces relative to the other of the first and second connection interfaces.

16. The method according to claim 15 wherein one of the plurality of mounting orientations comprises a parallel orientation, and wherein step (e) comprises rotation one of the first and second connection interfaces relative to the other of the first and second connection interfaces such that central axes defined by the first and second exhaust components are parallel to each other.

17. The method according to claim 14 including forming each of the first and second connection interfaces to include a polygonal tubular portion that transitions into a curvilinear tubular portion and wherein step (f) further comprises connecting the curvilinear tubular portions to each other.

18. The method according to claim 14 including mounting an injector to one of the first and second housing portions, the injector configured to inject a fluid into the mixer.

19. The method according to claim 14 wherein one of the first and second connection interfaces is rotated relative to the other of the first and second connection interfaces about an axis of rotation when moving between the plurality of mounting orientations, and wherein the plurality of different mounting orientations includes at least a parallel mounting orientation where central axes defined by the first and second exhaust components are parallel to each other and a non-parallel mounting orientation where the central axes are non-parallel to each other, and wherein the axis of rotation is perpendicular to at least one of the central axes defined by the first and second exhaust components.

* * * * *